OR  4,054,358

United States Patent [19]
Burke et al.

[11] 4,054,358
[45] Oct. 18, 1977

T 350/361

[54] RECORDING A PHASE HOLOGRAM HAVING REDUCED INTERMODULATION DISTORTION

[75] Inventors: William Joseph Burke; Ping Sheng, both of Princeton, N.J.

[73] Assignee: RCA Corporation, New York, N.Y.

[21] Appl. No.: 684,238

[22] Filed: May 7, 1976

[51] Int. Cl.² ............................................. G03H 1/04
[52] U.S. Cl. .................................................. 350/3.5
[58] Field of Search ..................................... 350/3.5

[56] References Cited
U.S. PATENT DOCUMENTS 3,516,721   6/1970   Collier et al. .................... 350/3.5

OTHER PUBLICATIONS

Carlsen, *Applied Optics,* vol. 13, No. 4, Apr. 1974, pp. 896–903.
Som et al., *Jour. of the Optical Society of America,* vol. 61, No. 9, Sept. 1971, pp. 1240–1245.

*Primary Examiner*—Ronald J. Stern
*Attorney, Agent, or Firm*—Leonard Weiss; Joseph D. Lazar; H. Christoffersen

[57] ABSTRACT

A moveable mask with a pin hole therethrough is disposed between a source of an object beam and a holographic recording medium. The pin hole limits the angular range of rays of the object beam transmitted to the medium, thereby preventing intermodulation distortion caused by rays of the object beam that have large angles therebetween. The mask may be moved to cause all of the rays of the object beam to pass through the pin hole, whereby a hologram is recorded.

4 Claims, 2 Drawing Figures

RECORDING A PHASE HOLOGRAM HAVING REDUCED INTERMODULATION DISTORTION

The Government has rights in this invention pursuant to Contract No. N00014-75-C-0590 awarded by the Department of the Navy.

BACKGROUND OF THE INVENTION

1. Field of the Invention

This invention relates to holography and more particularly, to preventing intermodulation distortion of an image reconstructed from a phase hologram.

2. Description of the Prior Art

A phase hologram is a diffraction grating recorded by modulating either the index of refraction or the thickness of a recording medium with a desired interference pattern. The desired interference pattern is formed at the medium by an interaction of two mutually coherent beams of recording light. One of the beams, referred to as an object beam, has rays that are spatially modulated in either phase of amplitude to provide a representation of an image; the other beam is referred to as a reference beam. A reconstruction of the image emanates from the hologram in response to a transmission thereto of a reconstructing beam.

In addition to the desired interference pattern, an undesired interference pattern if formed by rays of the object beam that interact with each other at the medium. The undesired interference pattern is a cause of what is known as intermodulation distortion during a reconstruction of the image. The intermodulation distortion is a dominant form of distortion when the thickness of the recording medium is less than a wavelength of the recording light.

The intermodulation distortion may be reduced by maintaining the diffraction efficiency of the hologram at a low level, typically in a range of one to three percent. The low diffraction efficiency causes the reconstruction of the image to be of low intensity compared with the intensity of the reconstructing beam. Therefore, the low diffraction efficiency is undesirable.

SUMMARY OF THE INVENTION

According to the present invention, an angular range of rays of an object beam transmitted to a recording medium is limited by a pin hole aperture in a mask disposed between a source of the object beam and the medium. The mask is moved to cause substantially all of the rays to pass through the pin hole and form interference patterns with a reference beam at the medium.

DESCRIPTION OF THE PREFERRED EMBODIMENT

Figure 1:
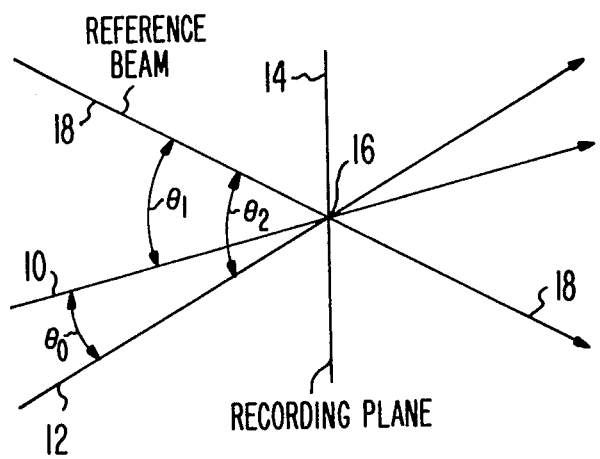
FIG. 1 is a schematic showing components of an object beam and a reference beam intersecting in a recording plane.

Referring to FIG. 1, an object beam has rays 10,12 at an angle $\theta_0$ which intersect in a holographic recording plane 14 at a point 16. Additionally, a ray 18 of a reference beam intersects the point 16, whereby the rays 10,12 form angles $\theta_1$, $\theta_2$, respectively, with the ray 18.

In a recording of a phase hologram, the rays 10,18 interact to form a desired interference pattern from which a first diffraction grating is provided. The first grating has a spatial frequency in accordance with a relationship which is given as $$f_1 = 2 \sin(\theta_1/2)/\lambda$$

where $f_1$ is the frequency of the first grating; and
$\lambda$ is the wavelength of the object and reference beams.

In a similar manner, the rays 12,18 interact to form a desired interference pattern from which a second diffraction grating is provided. The second grating has a spatial frequency in accordance with a relationship which is given as $$f_2 = 2 \sin(\theta_2/2)/\lambda$$

where $f_2$ is the frequency of the second grating.

As known to those skilled in the holography art, the rays 10,12 interact to form an undesired interference pattern from which a third diffraction grating is provided. The third grating, which causes the intermodulation distortion referred to hereinbefore, has a spatial intermodulation frequency in accordance with a relationship which is given as $$f_{12} = 2 \sin(\theta_0/2)/\lambda$$

where $f_{12}$ is the intermodulation frequency.

It should be understood that when the third grating has a low intermodulation frequency, only the first and second gratings have a discernable effect on an image reconstructed from the gratings. Since the intermodulation frequency is in a direct relationship with the angle $\theta_0$ (for $\theta_0$ between zero and ninety degrees), when the angle $\theta_0$ is small, the intermodulation distortion may be undiscernable.

When one of the rays, 10,12 is blocked from transmission to the plane 14, the undesired interference pattern is eliminated while a desired interference pattern is formed. In the present invention, a spatial filter limits the angular range of rays of an object beam transmitted to a recording medium.

Figure 2:
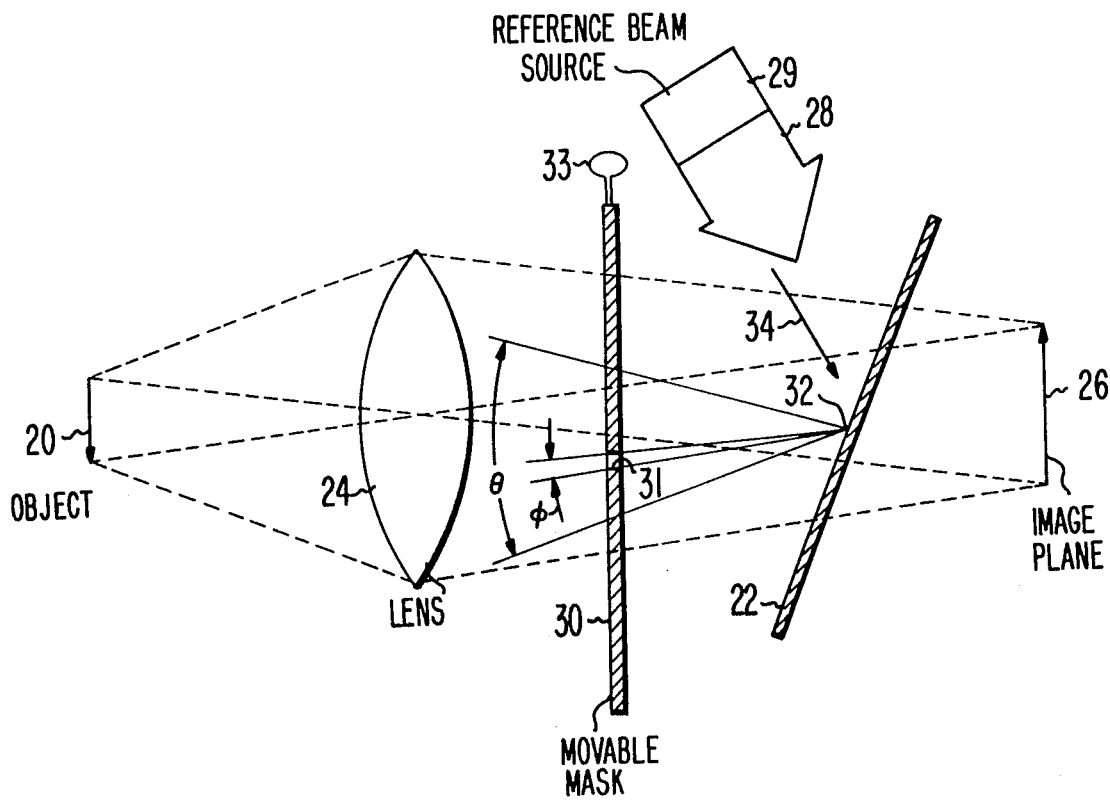
FIG. 2 is a schematic showing apparatus including a mask, in accordance with a preferred embodiment of the present invention, for recording a hologram having reduced intermodulation distortion.

FIG. 2 shows an apparatus for recording a hologram of an object 20 on a recording medium 22. An object beam from the object 20 is images by a lens 24 at an image plane 26. The recording medium 22 is positioned between the lens 24 and the image plane 26. A reference beam 28 from a source 29 is directed to the recording medium 22 along a different path, so that the reference beam and the object beam produce an interference pattern on the recording medium 22 which is recorded thereon as a phase hologram of the object 20.

A movable mask 30, having a pinhole aperture 31, is positioned between the lens 24 and the recording medium 22. The diameter of the aperture 31 may be about 100 microns, and is not so small as to cause substantial diffraction of the components of the object beam that pass therethrough. The mask 30 is movable manually in a plane at right angles to the optical axis of the object beam by means of a knob 33 and guides (not shown) for the mask 30. Any other suitable means may be employed to control the movement of the mask so that most or all of the object beam light is sequentially passed through the aperture 31 in the mask 30.

In the prior art arrangements not having the movable mask 30, the object beam from object 20 includes rays which reach the recording medium 22 from a number of different directions. For example, the object beam rays reach a point 32 on the recording medium 22 from angles within a range designated $\theta$. These object beam rays form interference patterns with a ray of the reference beam reaching the recording medium 22 along a path having the direction 34. All other points on the medium 22 also receive object beam rays and reference beam rays, whereby a hologram of the object 20 is recorded on the medium 22.

In the described prior art arrangement, the rays of the object beam which arrive at any point on the medium from different angles within a range such as $\theta$, undesirably interfere with each other and cause an interference pattern which produces an intermodulation distortion when the hologram is reproduced.

This intermodulation distortion is greatly reduced, according to the invention, by the use of the movable mask 30 having the aperture 31. When the mask is in the position shown, object beam rays can reach point 32 on the recording medium solely through the aperture 31, and solely within an angular range $\phi$. This angular range $\phi$ is determined by the size of the aperture and the distance of the mask 30 from the recording medium 22. The angular range $\phi$ is made so small that the rays of the object beam do not produce the interference patterns with each other which would result in disturbing intermodulation distortion. The object beam rays produce a desired interference pattern with the reference beam 28.

Other points on the recording medium simultaneously receive object beam rays from the object 20 which pass through the aperture 31 and are similarly confined to a narrow angular range $\phi$. As a result, a complete subhologram of the image 20 is formed on the surface of the recording medium 22. The subhologram is substantially free of object beam intermodulation, but the subhologram is weak because so much of the object beam light has been blocked by the mask 30.

To make a complete, fully-exposed hologram the movable mask 30 is successively moved through a large number of positions, forming a complete subhologram in each position. The mask may be moved so that substantially all of the object beam light is given an opportunity to pass through the aperture 31 to interfere with the reference beam 28 at the recording medium. The resulting large number of super-imposed subholograms constitute one strong hologram of the object 20, and this hologram is free of the intermodulation distortion characteristic of holograms produced without the movable mask.

What is claimed is

1. A method of recording a phase hologram with reduced distortion due to intermodulation between angular components of the object beam, comprising the steps of directing an object beam and a reference beam along different, spatially fixed paths towards a fixedly disposed recording medium, positioning a mask having a pinhole aperture in the path of said object beam so that said object beam reaches any particular point on said recording medium from a narrow range of angular directions determined by the size of the aperture and the distance of the aperture from the recording medium, whereby to record a subhologram of the object on the recording medium without disturbing intermodulation of different angular components of the object beam, and moving said mask to sequentially pass additional portions of the object beam, and to record additional superimposed subholograms of the object on the recording medium.

2. Apparatus for recording a phase hologram with reduced distortion due to intermodulation between angular components of an object beam, comprising means for directing the object beam and a reference beam along different, spatially fixed, paths toward a fixedly disposed recording medium, a movable mask having a pinhole aperture positioned in the path of said object beam so that object light reaches any particular point on said recording medium from a narrow range of angular directions determined by the size of the aperture and the distance of the aperture from the recording medium, whereby to record a subhologram of the object on he recording medium without disturbing intermodulation of different angular componenets of the object beam, and means for moving said mask to sequentially pass additional portions of the object beam, and to record additional superimposed subholograms of the object on the recording medium.

3. Apparatus according to claim 2 wherein said aperture has a diameter substantially equal to 100 microns.

4. A phase hologram with reduced distortion due to intermodulation between angular components of the object beam produced by directing an object beam and a reference beam along different, spatially fixed, paths towards a fixedly disposed recording medium, positioning a mask having a pinhole aperture in the path of said object beam so that said object beam reaches any particular point on said recording medium from a narrow range of angular directions determined by the size of the aperture and the distance of the aperture from the recording medium, whereby to record a subhologram of the object on the recording medium without disturbing intermodulation of different angular components of the object beam, and moving said mask to sequentially pass additional portions of the object beam, and to record additional superimposed subholograms of the object on the recording medium.

* * * * *